(12) United States Patent
Coull et al.

(10) Patent No.: US 12,711,227 B2
(45) **Date of Patent: *Aug. 18, 2026**

(54) SYSTEM AND METHOD FOR HETEROGENEOUS TRANSFERRED LEARNING FOR ENHANCED CYBERSECURITY THREAT DETECTION

(71) Applicant: Google LLC, Mountain View, CA (US)

(72) Inventors: Scott Eric Coull, Cary, NC (US); David Krisiloff, Arlington, VA (US); Giorgio Severi, Brookline, MA (US)

(73) Assignee: GOOGLE LLC, Mountain View, CA (US)

( * ) Notice: Subject to any disclaimer, the term of this patent is extended or adjusted under 35 U.S.C. 154(b) by 237 days.

This patent is subject to a terminal disclaimer.

(21) Appl. No.: 18/749,404

(22) Filed: Jun. 20, 2024

(65) Prior Publication Data

US 2026/0050666 A1 Feb. 19, 2026

Related U.S. Application Data

(63) Continuation of application No. 18/047,204, filed on Oct. 17, 2022, now Pat. No. 12,045,343, which is a (Continued)

(51) Int. Cl.
*G06F 21/55* (2013.01)
*G06N 20/00* (2019.01)

(52) U.S. Cl.
CPC .......... *G06F 21/554* (2013.01); *G06N 20/00* (2019.01); *G06F 2221/034* (2013.01)

(58) Field of Classification Search
CPC .................................................. G06F 21/554
See application file for complete search history.

(56) References Cited

U.S. PATENT DOCUMENTS 11,023,814 B1 6/2021 Lee et al.
11,227,047 B1 * 1/2022 Vashisht ................ G06N 20/00

(Continued)

OTHER PUBLICATIONS

Singla et al., "Overcoming the Lack of Labeled Data: Training Intrusion Detection Models", Institute of Electrical and Electronics Engineers International Conference on Smart Computing, Washington, District of Columbia, United States, Jun. 12-15, 2019, pp. 69-74.

*Primary Examiner* — Simon P Kanaan
(74) *Attorney, Agent, or Firm* — DORITY & MANNING P.A.

(57) ABSTRACT

A method includes training a first machine learning model with a first dataset, to produce a first trained machine learning model to infer cybersecurity-oriented file properties and/or detect cybersecurity threats within a first domain. The first dataset includes labeled files associated with the first domain. The first trained machine learning model includes multiple layers, some of which are trainable. A second trained machine learning model is generated, via a transfer learning process, using (1) at least one trainable layer from the multiple trainable layers of the first trained machine learning model, and (2) a second dataset different from the first dataset. The second dataset includes labeled files associated with a second domain. The first domain has a different syntax, different semantics, and/or a different structure than that of the second domain. The second trained machine learning model (e.g., a deep neural network model) is then available for use in inferring cybersecurity-oriented properties of the file in the second domain and/or detecting cybersecurity threats in the second domain.

20 Claims, 6 Drawing Sheets

Related U.S. Application Data continuation of application No. 16/542,739, filed on Aug. 16, 2019, now Pat. No. 11,475,128.

(56) References Cited

U.S. PATENT DOCUMENTS

| | | | |
|---|---|---|---|
| 11,301,718 | B2 | 4/2022 | Hamedi et al. |
| 11,475,128 | B2 | 10/2022 | Coull et al. |
| 12,111,928 | B2 * | 10/2024 | Ma ......................... G06N 20/00 |
| 2019/0132334 | A1 | 5/2019 | Johns et al. |
| 2019/0171978 | A1 | 6/2019 | Bonawitz |
| 2020/0233936 | A1 | 7/2020 | Veshchikov et al. |
| 2021/0073377 | A1 * | 3/2021 | Coull .................... G06F 21/554 |
| 2021/0089861 | A1 | 3/2021 | Sibille |

* cited by examiner

SYSTEM AND METHOD FOR HETEROGENEOUS TRANSFERRED LEARNING FOR ENHANCED CYBERSECURITY THREAT DETECTION

CROSS-REFERENCED TO RELATED APPLICATIONS

The present application is a continuation of U.S. application Ser. No. 18/047,204 having a filing date of Oct. 17, 2022, which is a continuation of United States Application Number Ser. No. 16/542,739 having a filing date of Aug. 16, 2019. Applicant claims priority to and the benefit of each of such applications and incorporate all such applications herein by reference in its entirety.

TECHNICAL FIELD

The present disclosure relates generally to the detection of cyber-threats, and more specifically, to systems for transferring machine learning model information for a first domain to a machine learning model for a second domain different from the first domain.

BACKGROUND

Cybersecurity threats are constantly changing, and many cybersecurity solutions are reactive. Classification of cybersecurity threats is important to selecting appropriate mitigations. Machine learning techniques may be used for classification of files, communication packets or other objects based on cybersecurity properties, for example by analyzing the structure, syntax and/or semantics of the files, communication packets and/or other objects. Emergent cybersecurity threats are challenging to classify due to a lack of historical data upon which to train a machine learning model. Without historical data, there are challenges in identifying cybersecurity threats that leverage new attack vectors.

SUMMARY

In some embodiments, a method includes training a first machine learning model with a first dataset, to produce a first trained machine learning model to detect cybersecurity threats within a first domain. The first dataset includes labeled files associated with the first domain. The first trained machine learning model (e.g., a deep neural network model) includes multiple trainable layers. A second trained machine learning model is generated, via a transfer learning process, using (1) at least one trainable layer from the multiple trainable layers of the first trained machine learning model, and (2) a second dataset different from the first dataset. The second dataset includes labeled files associated with a second domain. The first domain has a different syntax, different semantics, and/or a different structure than that of the second domain. The second trained machine learning model (e.g., a deep neural network model) is then available for use in inferring cybersecurity-oriented properties of the file and/or detecting cybersecurity threats in the second domain. Inferring cybersecurity-oriented properties of the file can include, for example, malware categorization (e.g., malware family), malware classification (e.g., benign, suspicious, malicious, etc.), and file authorship identification (e.g., malware attribution to a malicious actor or group), etc.

In some embodiments, a method for training machine learning models for cybersecurity threat detection includes receiving a first trained machine learning model at a machine learning system associated with a second domain. The first trained machine learning model is trained to infer cybersecurity-oriented file properties and/or detect cybersecurity threats within a first domain different from the second domain. The first trained machine learning model is trained, via a transfer learning process and using a dataset including labeled files associated with the second domain, to produce a second trained machine learning model. A labeled file associated with the second domain is then analyzed, at the machine learning system and using the second trained machine learning model, to determine a cybersecurity risk associated with the labeled file.

In some embodiments, a method for training machine learning models for cybersecurity threat detection includes training a first machine learning model with a first dataset, to produce a first trained machine learning model to infer cybersecurity-oriented file properties and/or detect cybersecurity threats within the first domain. The first dataset includes labeled files associated with a first domain. A second trained machine learning model is then generated, via a transfer learning process. The transfer learning process includes modifying the first trained machine learning model to produce a modified first trained machine learning model. The transfer learning process also includes training the modified first trained machine learning model with a second dataset different from the first dataset, the second dataset including labeled files associated with a second domain, to produce the second trained machine learning model. The first domain has a different syntax, different semantics, and/or a different structure than that of the second domain.

DETAILED DESCRIPTION

Figure 1:
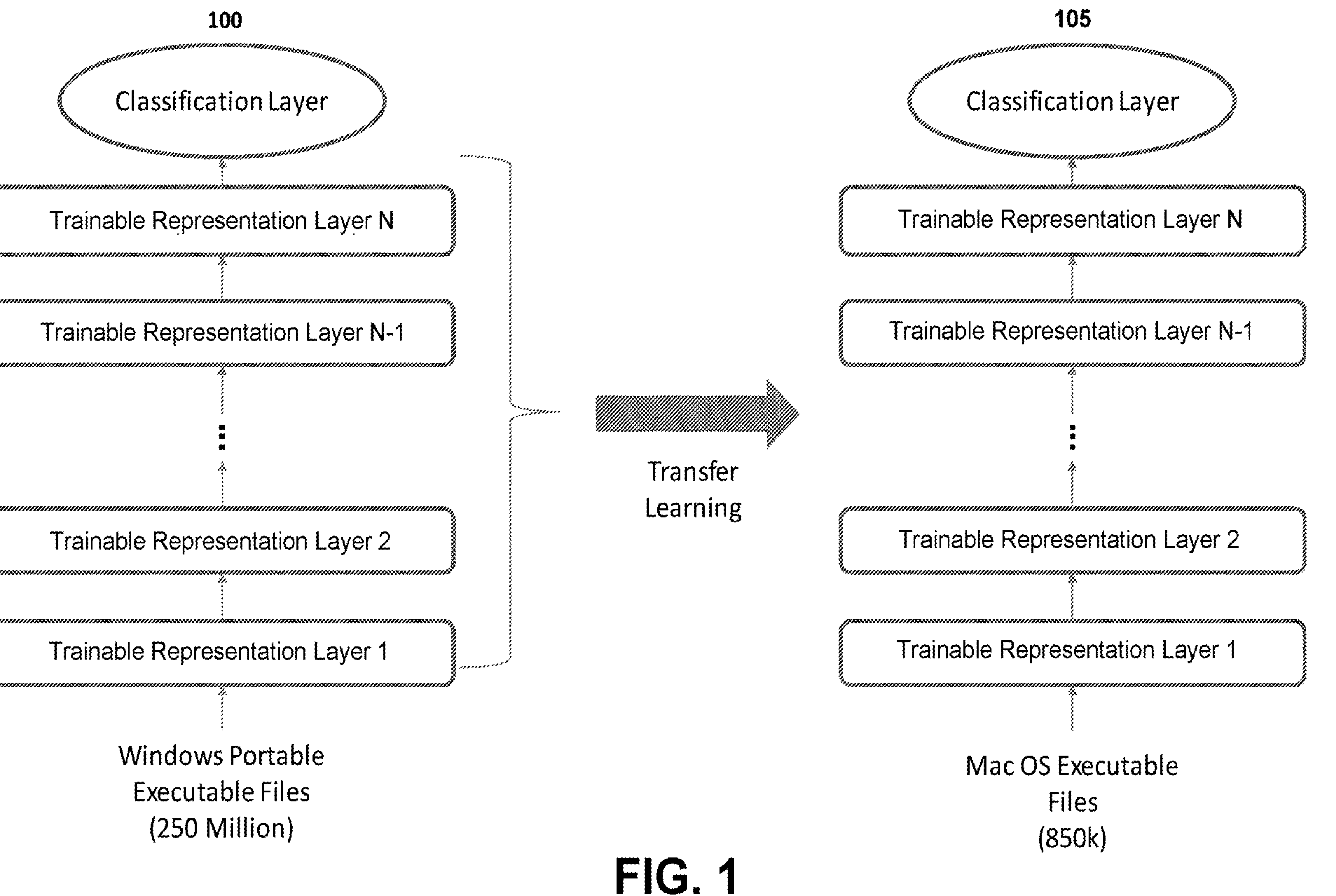
FIG. 1 is a diagram comparing classifiers for different domains, according to an embodiment.

Developing deep learning models for cybersecurity detection can be challenging and time-consuming, for example because a precondition for training is to generate or obtain a representative, training dataset associated with the domain of interest. For example, developing a cybersecurity detection model for executable malware can include collecting and curating a dataset of labeled malicious and benign executable files, then generating, via a deep learning system and based on the dataset, a model for determining the maliciousness of unlabeled samples. Curating a dataset of labeled malicious and benign executable files can include appending labels to, or otherwise associating labels with, data from a pre-curation dataset, for example based on previously-detected cybersecurity attacks (which may include, but are not necessarily limited to, malware-based attacks). Curation of the dataset of labeled malicious and benign executable files can be performed by human analysts and/or by automated cybersecurity analysis software/systems. Known machine learning techniques generally rely on large volumes of training data to achieve acceptable predictive accuracy.

For situations in which a new attack vector or domain (e.g., one or more executable files or non-executable document files containing scripting components) has recently been put into commercial use, or targeted by malicious actors, however, little operational data is available with which to perform such analyses, or from which to draw for the purposes of deep learning classification. Machine learning models generated based on small datasets are susceptible to false positives and false negatives because they do not contain sufficiently representative samples of the underlying population. Thus, new cybersecurity attack vectors or domains can remain undefended for a protracted period of time, leaving computing systems vulnerable.

Systems and methods of the present disclosure facilitate the training of a file-based machine learning model (or "classifier") for cybersecurity threat detection for labeled files within a domain for which insufficient data exists (when considered in the context of known techniques) for accurate prediction. As used herein, "cybersecurity" refers to the practice of protecting systems (e.g., networked systems) from digital attacks, to ensure the integrity, confidentiality, and availability of information and data within those systems. A computer file (or "file") refers to a computer resource that stores/records data, information, settings, and/or commands associated with a computer software discretely in a computer storage device. While some files may contain other files within them (e.g., zip files), they themselves remain independent entities that can be acted upon by computer software programs (potentially to produce additional files, e.g., through decompression/unzipping). The term "computer file" generally refers to content in the form of an item of information having a logical structure or organization that enables it to be analyzed for purposes of cybersecurity. Accordingly, a file may include data, including, for example, text and/or an executable such as an application, program, code segment, a script, dynamic link library ("dll"), or other element having a format that can be stored, processed, executed, and/or interpreted. Training of the classifier is accomplished by leveraging information learned by a mature/fully-trained machine learning model from a different/separate domain (i.e., an extra-domain machine learning model), via a process referred to herein as "transfer learning." Known uses of "transfer learning" generally refer to the transfer of learned representation information (e.g., feature information) between domains that share a common underlying representation space (e.g., English language text representations applied to sentiment analysis, part-of-speech tagging, and other natural language problems). As used herein, however, transfer learning refers to the transfer of learned information between domains having disparate underlying representations.

In some embodiments, a transfer learning process first includes fully training an extra-domain machine learning model (i.e., for a domain other than the domain of interest, and differing in one or more of syntax(es), semantics, or structural feature(s) from the domain of interest), and then using that fully trained extra-domain machine learning model as a starting point for further training, using files of the domain of interest, to generate a fully trained machine learning model for the domain of interest (e.g., such that it can classify files based on their maliciousness, to a desired degree of accuracy). As used herein, a "domain" refers to a set of possible values or characteristics (e.g., syntax(es), semantics and/or structure) for a given computer software environment such as, for example: an executable software file type, an operating system, an electronic document type, or a script in an interpreted programming language (the latter referring to processable code that is interpreted and not compiled). For example, using systems and methods set forth herein, a machine learning model generated for a Windows® portable executable (PE) (WinPE) files can be used as part of a transfer learning process for generating a machine learning model for a Unix or MacOS operating system executable file. As another example, using systems and methods set forth herein, a machine learning model generated for the JavaScript scripting language can be used as part of a transfer learning process for generating a machine learning model for a VBScript scripting language. As another example, using systems and methods set forth herein, a machine learning model generated for Microsoft Word files can be used as part of a transfer learning process for generating a machine learning model for Excel files.

"Fully training" refers to training a machine learning model until a predictive accuracy above a specified threshold is attained or until predictive accuracy plateaus during training. The fully-trained extra-domain machine learning model includes a plurality of trainable "layers" each including a matrix of weights. A "trainable layer" refers to a layer of a neural network whose weights are updated during the training process. Each matrix of weights can include/encode a variety of features of the domain associated with that machine learning model. The features can include high-level (global) features (e.g., structural aspects of code, such as the presence or absence of sections of the file, invalid header values, the presence of embedded executables or resources (e.g., images), etc.) and low-level (local) features (e.g., textual strings used in the file, import names, application programming interfaces (APIs) for functionality provided by the operating system (e.g., cryptography and network), specific instruction sequences, specific byte sequences, library import names, compressed data, and/or encrypted data). In some embodiments, one or more trainable layers from the plurality of trainable layers includes only high-level features, while a different one or more trainable layers from the plurality of trainable layers includes only low-level features. In other embodiments, each trainable layer from the plurality of trainable layers or each trainable layer of a subset of trainable layers from the plurality of trainable layers includes a combination of high-level features and low-level features.

At least one trainable layer from the plurality of trainable layers of the fully-trained extra-domain machine learning model is used in the training of a machine learning model for the domain of interest. The domain of interest may, for example, be a domain that has recently been placed into commercial use and/or one for which insufficient historical data exists for training a machine learning model using known methods. The training of the machine learning model for the domain of interest can be based on (1) the at least one trainable layer from the plurality of trainable layers of the fully-trained extra-domain machine learning model in modified or unmodified form (e.g., with one or more trainable layers thereof being frozen and/or modified), and (2) historical and/or training data associated with the domain of interest. In some implementations, one or more of the trainable layers from the plurality of trainable layers of the fully-trained extra-domain machine learning model can be retained in unmodified form, and one or more of the trainable layers from the plurality of trainable layers of the fully-trained extra-domain machine learning model can be modified (at least in part) prior to use in training the machine learning model for the domain of interest. Modifications to the one or more of the trainable layers from the plurality of trainable layers of the fully-trained extra-domain machine learning model can include one or more of: freezing one or more trainable layers such that they are retained but not modified, eliminating one or more trainable layers, revising one or more of the trainable layers (e.g., changing one or more weights thereof), and combining/merging trainable layers from the plurality of trainable layers. The modifications to the one or more of the trainable layers from the plurality of trainable layers of the fully-trained extra-domain machine learning model can be selected based, for example, on an application type associated with the domain of interest. The trained machine learning model for the domain of interest can then be used (e.g., as a classifier) in analyzing and assessing the cybersecurity risk of new data generated through usage of the domain of interest. In some implementations, the at least one layer from the plurality of trainable layers of the fully-trained extra-domain machine learning model includes a subset of trainable layers from the plurality of trainable layers of the fully-trained extra-domain machine learning model (i.e., some trainable layers from the plurality of trainable layers of the fully-trained extra-domain machine learning model are excluded, for example in response to detecting an incompatibility between, or a lack of overlap in features between, those trainable layers and the domain of interest). In some embodiments, at least one trainable layer from the plurality of trainable layers of the fully-trained extra-domain machine learning model is selected for use in the transfer learning process. The selection of at least one trainable layer can be based, for example, on empirical analysis of the performance of the model, or on other analysis procedures aimed at understanding the representations encoded in the trainable layer. By way of example only, the selection of the at least one trainable layer can be based on one or more properties of the trainable layers from the plurality of trainable layers, e.g., the number of low-level features included in or represented by those layers, the number of high-level features included in or represented by those layers, an overlap between features of those layers and features associated with the domain of interest, a degree of similarity between features of those layers and features associated with the domain of interest, etc.

In some embodiments, a transfer learning system generates a first machine learning model based on one or more neural networks and using a first dataset. The system generates a set of weights for each layer of a set of layers of the neural network, the sets of weights representing the learned features of the first dataset. The sets of weights of the trainable layers of the neural network are provided, or "transferred," to a second machine learning system that uses some or all of the sets of weights to generate a second machine learning model. For example, a copy of the matrices of weights can be inserted into an appropriate location within the second machine learning model. The second machine learning model is then further trained (e.g., "fine-tuned") using a second dataset that includes fewer examples (i.e., less representative data), such as files or other objects, than the first dataset. During further training of the second machine learning model, the transferred sets of weights can be adjusted based on the second dataset.

In some embodiments, the first dataset and the second dataset share a common, similar, or at least partially overlapping labeling system, for example in that the labelling of files as malicious or benign using the same, a similar, or an at least partially overlapping label. In other embodiments, the first dataset and the second dataset are associated with different labels (e.g., a first dataset may include labels associated with relating malware families, while the second dataset may include labels relates to maliciousness classification (e.g., benign versus malicious)).

In some embodiments, the first dataset can be a relatively large dataset that is, for example, related to a computing platform with a first operating system (OS) (e.g., a Windows® computing platform), and the second dataset can be a relatively smaller dataset that is, for example, related to a computing platform with a second OS (e.g., Mac OS) different from the first OS. In other words, and by way of example, the first dataset may be from or associated with a first domain (e.g., Windows® portable executables (PEs) such as Windows PEs that are labeled malicious and/or benign are a first file type), while the second dataset may be from a second domain different from the first domain (e.g., Mach-O or Executable and Linkable Format (ELF) executable files that are labeled malicious and/or benign are a second file type different from the first file type). As discussed above, the second dataset may be a smaller dataset than the first dataset because the second dataset may be related to a new attack vector or domain for which fewer analyses have been performed and/or for which fewer cyberattacks have been detected. Alternatively, or in addition, the second dataset may include an unrepresentative sample of subpopulations within the second domain.

FIG. 1 is a diagram comparing machine learning models (or "classifiers") for different domains, according to an example embodiment. A first classifier 100, designed for Windows® PE files and trained using 250 million Windows® PE files (by way of illustrative example only), includes multiple trainable representation layers (shown in FIG. 1 as "Trainable Representation Layer 1," "Trainable Representation Layer 2," up to and including "Trainable Representation Layer N") and a classification layer. Once the first classifier 100 has been fully trained, some or all of the trainable representation layers, optionally with modifications to one or more of the trainable representation layers, can be provided, via transfer learning, for use in training a second classifier 105 that can classify maliciousness of Mac OS executable files. During the transfer learning process, the trainable representation layers provided from the first classifier 100 can be used to generate a foundational/intermediate machine learning model that is further trained using the relatively smaller dataset (850,000 MacOS executable files, by way of illustrative example only) to produce the second classifier 105. Similar to the first classifier 100, the second classifier 105 includes multiple associated trainable representation layers (shown in FIG. 1 as "Trainable Representation Layer 1," "Trainable Representation Layer 2," up to and including "Trainable Representation Layer N") and a classification layer. In some embodiments, all of the trainable layers in the second classifier 105 are transferred (e.g., copied) directly from the first classifier 100. In other embodiments, some of the trainable layers in the second classifier 105 are transferred (e.g., copied) directly from the first classifier 100, while others are modified to be reset (e.g., some of the trainable layers may be partially or completely retrained/relearned, or some or all information learned from the first classifier 100 can be deleted before training the second classifier 105).

Figure 2:
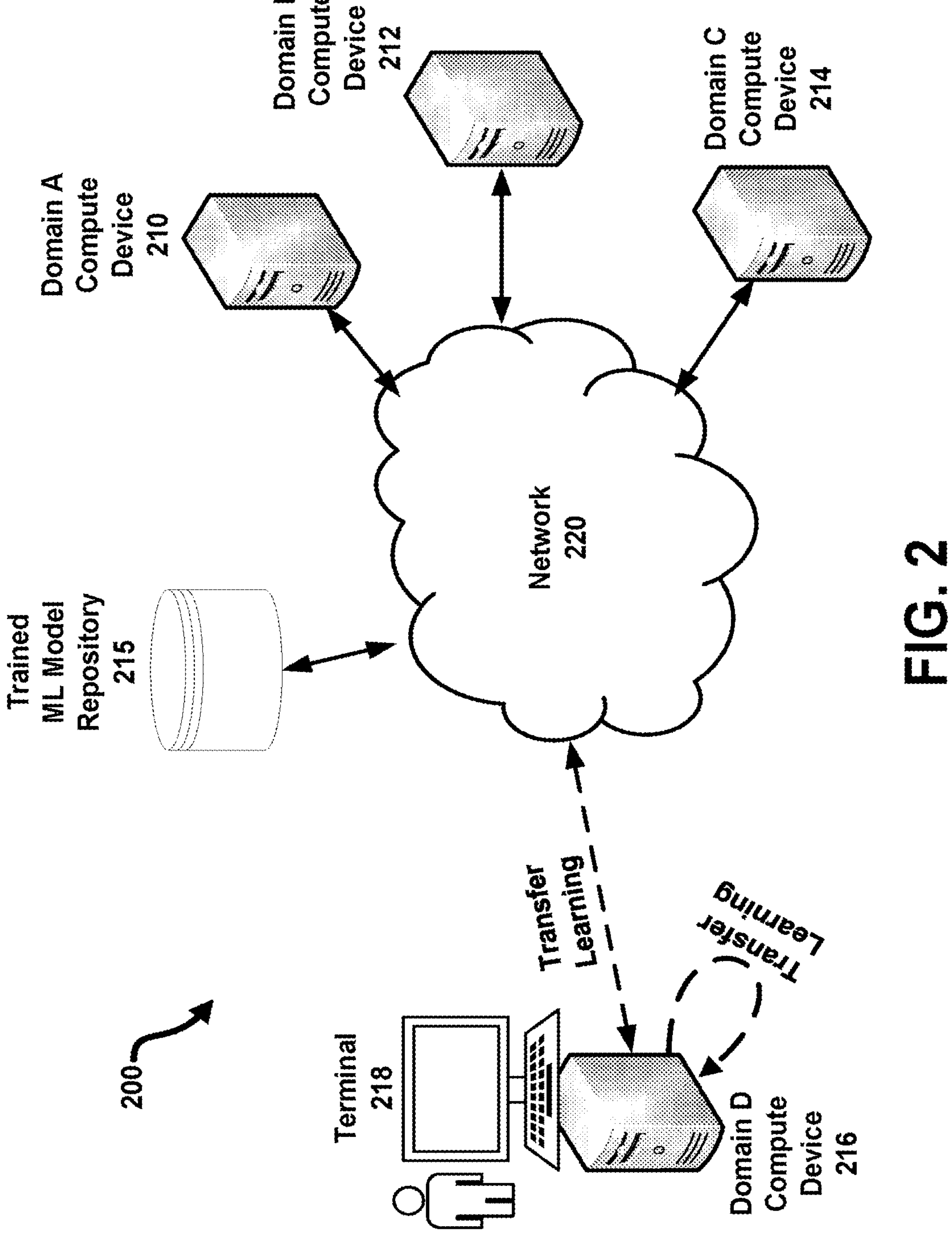
FIG. 2 is a diagram showing a networked transfer learning system, according to an embodiment.

FIG. 2 is a diagram showing a networked transfer learning system, according to an embodiment. The system 200 of FIG. 2 includes multiple compute devices each associated with a different domain—specifically, domain "A" compute device 210, domain “B” compute device 212, domain “C” compute device 214, and domain “D” compute device 216. Each of compute devices 210-216 can be communicably coupled, via a wireless or wired communications network 220, to a remote compute device hosting a machine learning (ML) model repository 215. Each of the compute devices 210-216 can include a processor and a memory in operable communication with the processor. Each memory can store instructions, executable by the processor, to perform specified functions. The instructions can be implemented in software (e.g., software modules stored in memory) and/or hardware. When trained ML models are generated at some or all of compute devices 210-214, the relevant compute devices 210-214 can transmit signals representing their associated trained ML models, for storage at the trained ML model repository 215. Subsequently, when a need is identified at compute device 216 for a trained ML model for the new domain “D,” the compute device 216 can retrieve, or receive in response to a query of the trained ML model repository 215, and as part of a transfer learning process, one or more of the trained ML models stored in the trained ML model repository 215. The identification of the need for the trained ML model for the new domain “D” can be based on input received from a user via a terminal 218 or other input device (e.g., including a graphical user interface (GUI)), based on detection at the compute device 216 of a software installation event, based on an automatic detection at the compute device 216 of an unrecognized file type, etc.

In some embodiments, upon receipt at compute device 216 of the one or more trained ML models from the trained ML model repository 215, the compute device 216 can immediately train the one or more trained ML models using one or more datasets associated with the new domain “D” to produce a trained ML model for the new domain “D.” In other embodiments, upon receipt at compute device 216 of the one or more trained ML models from the trained ML model repository 215, the compute device 216 can compare each of the one or more trained ML models with properties of the new domain “D” to identify one or a subset of the one or more “candidate” trained ML models that is most similar to, that best matches with, that at least partially overlaps with, or that most overlaps with, the one or more datasets associated with the new domain “D.” The foregoing comparison and selection of the one or a subset of the one or more trained ML models can be based, for example, on a scoring process that results in a down-selection of the trained ML models. In some embodiments, the selection of the one or a subset of the one or more trained ML models is based on a size of an expected input and/or output of a candidate trained ML model from the one or more trained ML models matching a size of an expected input and/or output of the new domain “D.” The identified one or a subset of the one or more trained ML models can then be trained using the one or more datasets associated with the new domain “D” to produce a trained ML model for the new domain “D.” In either of the foregoing embodiments, the compute device 216 can optionally modify one or more trainable layers of the one or more trained ML models received from the trained ML model repository, to produce a modified one or more trained ML models, prior to training the one or more trained ML models using the one or more datasets associated with the new domain “D” to produce a trained ML model for the new domain “D.”

Although the trained ML models from each of the compute devices 210-214 are described, with reference to FIG. 2, as being stored in the trained ML model repository 215, alternatively or in addition, some or all of the trained ML models generated anywhere within the networked system 200 can be stored at any or all of the compute devices 210-216. For example, the domain D compute device 216 may store trained ML models generated by some or each of compute devices 210-214 without retrieving those trained ML models from the trained ML model repository 215.

Figure 3:
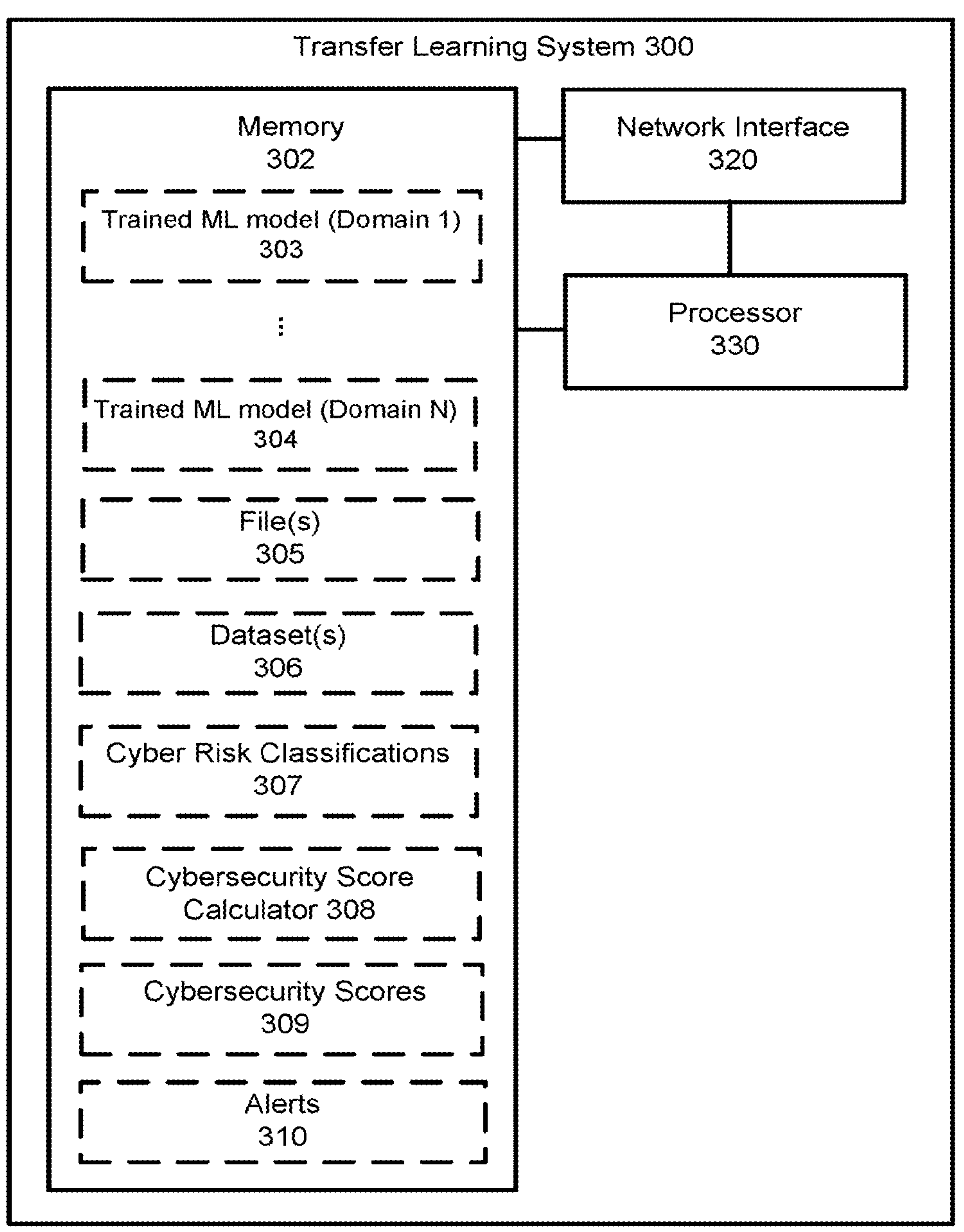
FIG. 3 is a diagram of a transfer learning system, according to an embodiment.

FIG. 3 is a diagram of a transfer learning system, according to an embodiment. The transfer learning system 300 can be implemented, for example, as one or more of the compute devices 216 in FIG. 2, and includes a processor 330 operably coupled to a network interface 320 and to a memory 302, the memory 302 likewise operably coupled to the network interface 320. The memory 302 stores one or more of: a trained ML model for a first domain 303, additional trained ML models up to a total of N trained ML models (including the trained ML model for domain N 304), files 305, dataset(s) 306, cybersecurity risk classifications 307, cybersecurity score calculator 308 (e.g., software code for calculating cybersecurity scores), cybersecurity scores 309, and alerts 310.

Figure 4:
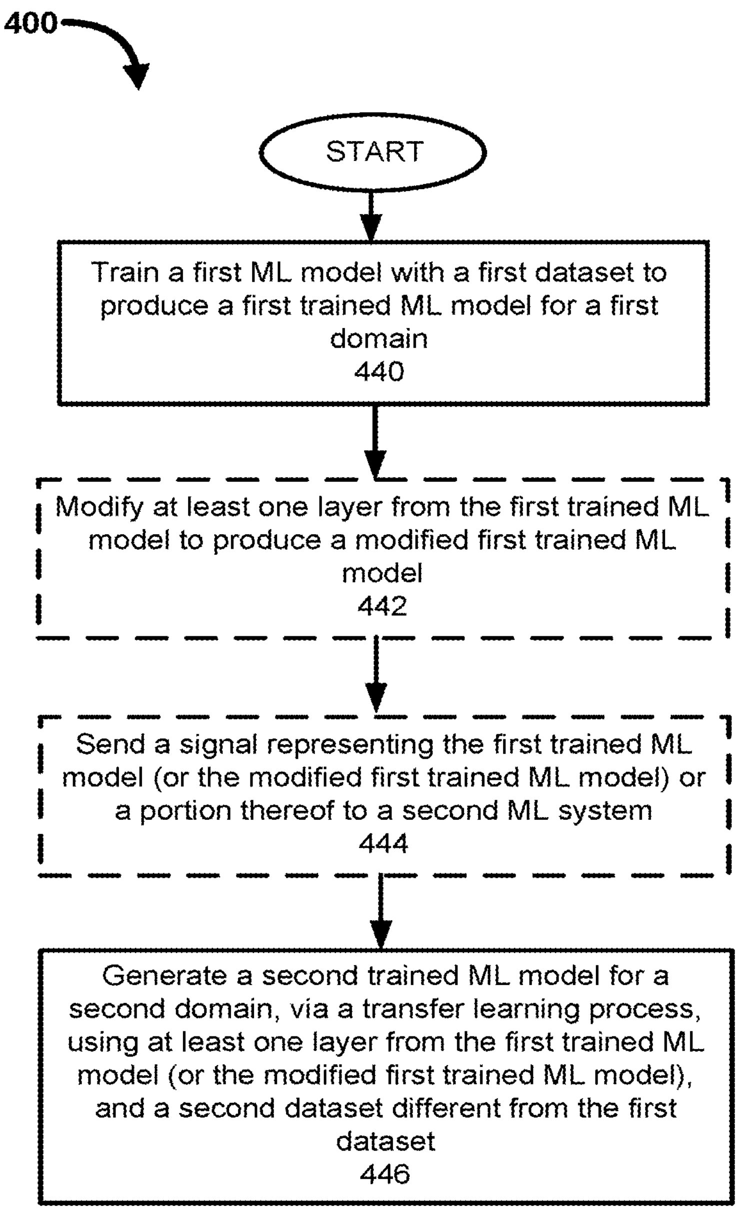
FIG. 4 is a flowchart showing a transfer learning method with optional layer modification, according to an embodiment.

FIG. 4 is a flowchart showing a transfer learning method with optional layer modification, according to an embodiment. As shown in FIG. 4, the method 400 includes training a first machine learning model, at a first ML system and with a first dataset, at 440, to produce a first trained machine learning model to infer cybersecurity-oriented file properties and/or detect cybersecurity threats within a first domain. The first dataset can include labeled files that are associated with the first domain. The first trained machine learning model includes multiple trainable layers (as shown, for example, in FIG. 1). At 442, at least one layer from the multiple trainable layers of the first trained ML model is optionally modified to produce a modified first trained ML model. At 444, a signal representing the first trained ML model or the modified first trained ML model (or a portion thereof) is optionally sent to a second ML system. At 446, a second trained machine learning model is generated, via a transfer learning process, using (1) at least one layer from the multiple trainable layers of the first trained machine learning model, and (2) a second dataset different from the first dataset. The second dataset includes labeled files associated with a second domain. The first domain has a different syntax, different semantics, and/or a different structure than that of the second domain. Alternatively or in addition, the first domain and the second domain may use different application programming interfaces (APIs). In some implementations, the first dataset and/or the second dataset do not include data packets. For example, the first dataset and/or the second dataset may not include network traffic data packets, or may not be a network intrusion system (NIDS) dataset. The second trained ML model can then be used to perform cybersecurity analyses of subsequently-received files associated with the second domain, and optionally calculate cybersecurity scores, generate and send alerts, trigger/cause the implementation of remedial measures, etc., in response to detecting a cybersecurity risk. Examples of remediation measures can include, but are not limited to: ceasing/stopping execution of a software application, deleting a file, quarantining a host, changing a firewall rule, blocking a user from accessing one or more computing resources (e.g., by modifying a permission setting or credential associated with the user), installing an update to a software application, etc. In some implementations, the first trained ML model and/or the second trained ML model are configured to perform classification of files both residing within (i.e., at rest on) a computer storage system and in transit across a network, but do not perform network traffic analysis or user behavioral analysis.

Figure 5:
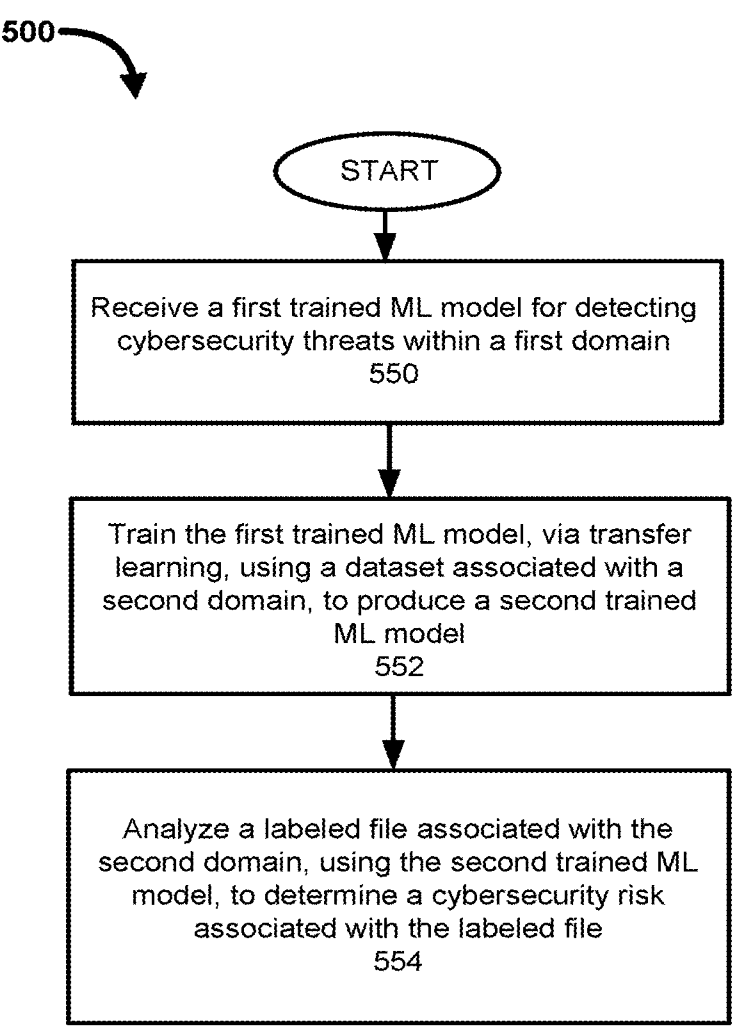
FIG. 5 is a flowchart showing a process including transfer learning and analysis of a labeled file, according to an embodiment.

FIG. 5 is a flowchart showing a process for training machine learning models for cybersecurity threat detection, including transfer learning and analysis of a labeled file, according to an embodiment. As shown in FIG. 5, the method 500 includes receiving, at 550, a first trained machine learning model at a machine learning system associated with a second domain. The first trained machine learning model is trained to infer cybersecurity-oriented file properties and/or detect cybersecurity threats within a first domain different from the second domain. The first trained machine learning model is trained, at 552, via a transfer learning process and using a dataset including labeled files associated with the second domain, to produce a second trained machine learning model. At 554, a labeled file associated with the second domain is then analyzed, at the machine learning system and using the second trained machine learning model, to determine a cybersecurity risk associated with the labeled file.

Figure 6:
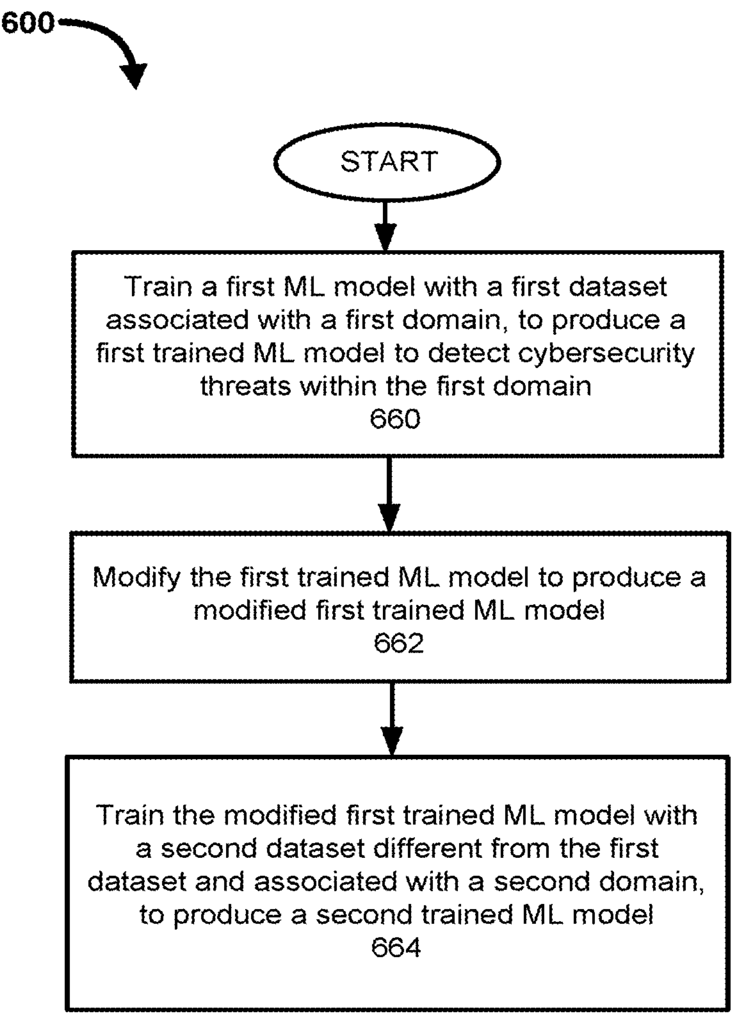
FIG. 6 is a flowchart showing a transfer learning method with model modification, according to an embodiment.

FIG. 6 is a flowchart showing a transfer learning method with model modification, according to an embodiment. As shown in FIG. 6, the method 600 includes training a first machine learning model with a first dataset, at 660, to produce a first trained machine learning model to infer cybersecurity-oriented file properties and/or detect cybersecurity threats within the first domain. The first dataset includes labeled files associated with a first domain. A second trained machine learning model is then generated, via a transfer learning process. The transfer learning process includes modifying the first trained machine learning model, at 662, to produce a modified first trained machine learning model. The modification to the first trained machine learning model at 662 can be a fully automated process, or can be performed in response to one or more user inputs, optionally specifying how the modification is to be performed (e.g., which trainable layers to retain, which trainable layers to retain and preserve in unmodified form, which trainable layers to modify, etc.). The modification to the first trained machine learning model at 662 can be based, for example, on a determination of which trainable layers encode high-level features and which trainable layers encode low-level features. For example, the last trained layer of the first trained machine learning model (including, e.g., the highest-level features, which may include structural components of a file such as the presence of a file section or the absence of a file section) may be completely reset so that all learned information from the first trained machine learning model is erased. The transfer learning process also includes, at 664, training the modified first trained machine learning model with a second dataset different from the first dataset, the second dataset including labeled files associated with a second domain, to produce the second trained machine learning model. The first domain has a different syntax, different semantics, and/or a different structure than that of the second domain.

In some embodiments, a method includes training a first machine learning model, at a first ML system and with a first dataset, to produce a first trained machine learning model to infer cybersecurity-oriented file properties and/or detect cybersecurity threats within a first domain. The first dataset can include labeled files that are associated with the first domain. The first trained machine learning model includes one trainable layer or multiple trainable layers. The method also includes training a second machine learning model, at a second ML system and with a second dataset (optionally having a smaller size, having a lower quality, and or being less representative of the associated domain, as compared with the first trained machine learning model), to produce a second trained machine learning model to infer cybersecurity-oriented file properties and/or detect cybersecurity threats within a second domain. The second dataset includes labeled files associated with a second domain. The first domain has a different syntax, different semantics, and/or a different structure than that of the second domain. An accuracy of the second trained machine learning model is then determined, by using the second trained machine learning model to perform cybersecurity analyses of subsequently-received files associated with the second domain. If the determined accuracy of the second trained machine learning model is equal to or above a specified threshold, the second trained machine learning model can be deemed sufficient. If the determined accuracy of the second trained machine learning model is below the specified threshold, the second trained machine learning model can be deemed insufficient, and a signal representing the first trained ML model (or a modified version of the first trained ML model or portion thereof, as discussed above) is sent to the second ML system for use in developing a replacement trained machine learning model for the second domain. The replacement trained machine learning model can be generated, via a transfer learning process, using (1) at least one layer from the multiple trainable layers of the first trained machine learning model, and (2) the second dataset. An accuracy of the replacement trained machine learning model is then determined, by using the replacement trained machine learning model to perform cybersecurity analyses of subsequently-received files associated with the second domain. If the determined accuracy of the replacement trained machine learning model is equal to or above a specified threshold, the replacement trained machine learning model can be deemed sufficient. If the determined accuracy of the replacement trained machine learning model is below the specified threshold, the replacement trained machine learning model can be deemed insufficient, and alternative datasets and/or trained machine learning models may be retrieved and used for additional training. Once a trained machine learning model is deemed sufficient (i.e., has an accuracy of at least the threshold value), that trained machine learning model can be used to perform cybersecurity analyses of subsequently-received files associated with the second domain, and optionally calculate cybersecurity scores, generate and send alerts, trigger/cause the implementation of remedial measures, etc., in response to detecting a cybersecurity risk.

In some embodiments, transfer learning is performed in response to a determination that an accuracy of a trained machine learning model for a domain of interest has an accuracy that is below a specified or predetermined threshold. Alternatively, or in addition, transfer learning can be performed in response to a determination that an available dataset for a domain of interest is skewed to an undesirable extent (e.g., includes a comparatively large number of malware examples, as compared with a small number of goodware examples, or vice versa). Alternatively, or in addition, transfer learning can be performed in response to a determination that an available dataset for a domain of interest is too small to be sufficiently representative of the domain of interest.

In some embodiments, the modification of a first trained machine learning model (e.g., at 662 of method 600 in FIG. 6) is based on a detected resource constraint at an endpoint where the second trained machine learning model will reside/operate. For example, if the endpoint is resourceconstrained, fewer trainable layers from the first trained machine learning model may be retained as part of the transfer learning process, such that the second trained machine learning model occupies less storage space and/or consumes fewer processing resources during operation/deployment.

In some embodiments, a transfer learning process includes generating and/or receiving multiple trained ML models for a first domain, and combining the multiple trained ML models to produce a composite trained ML model for the first domain. The composite trained ML model for the first domain is further trained, using one or more datasets containing files of a second domain, to produce a trained ML model for the second domain. The combining of the multiple trained ML models for the first domain can be performed at, or remotely from, the compute device at which the trained ML model for the second domain will reside/operate, prior to generating the trained ML model for the second domain.

Embodiments set forth herein can be used, for example, for the training of cybersecurity systems across a wide range of application environments (some of which may be relatively niche and thus may have little or no accumulated data available upon which to train) and associated with a wide range of compute devices. For example, applicable cybersecurity systems can be those associated with Internet of Things (IoT) devices (e.g., including but not limited to industrial controllers, vehicle info-entertainment systems, auto-drive systems, etc.), and such systems can be trained, at least in part, using datasets from other domains.

Although some transfer learning embodiments shown and described herein pertain to the detection of malicious files, transfer learning can alternatively or in addition be used for other file-based cybersecurity applications. For example, transfer learning can be used for the categorization of malware where a large number of examples of a first particular type or class of malware (e.g., malware family) is available, while relatively few examples of a different, second type or class of malware are available. In other words, a trained machine learning model (or portion thereof) generated for malware classification (e.g., benign or malicious classification) can be used to bootstrap a model for categorization of files into classes of malware. As another example, transfer learning may be used for authorship identification, by transferring at least some features associated with certain malware authors within a large, representative dataset (e.g., including PE files) to a different domain (e.g., including Mach-O or industrial control system executables).

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

It is intended that the systems and methods described herein can be performed by software (stored in memory and/or executed on hardware), hardware, or a combination thereof. Hardware modules may include, for example, a general-purpose processor, a field programmable gates array (FPGA), and/or an application specific integrated circuit (ASIC). Software modules (executed on hardware) can be expressed in a variety of software languages (e.g., computer code), including Unix utilities, C, C++, Java™, JavaScript, Ruby, SQL, SAS®, Python, Fortran, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, solid state storage devices, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Processor-executable instructions can be in many forms, such as program modules, executed by one or more compute devices, and can include routines, programs, objects, components, data structures, and other suitable code that causes a processor to perform particular tasks or implement particular data types, and the functionality can be combined and/or distributed as appropriate for various embodiments.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

The invention claimed is:

1. A method for training machine learning models for cybersecurity threat detection, the method comprising:

training a first machine learning model with a first dataset including labeled files associated with a first domain, to produce a first trained machine learning model, the first trained machine learning model including a plurality of trainable layers; and generating a second trained machine learning model via a transfer learning process using (1) at least one trainable layer from the plurality of trainable layers of the first trained machine learning model, and (2) a second dataset different from the first dataset, the second dataset including labeled files associated with a second domain;

wherein the second domain is a cybersecurity-oriented domain;

wherein the second trained machine learning model is configured to infer cybersecurity-oriented file properties within the second domain; and wherein the first domain has at least one of a different syntax, different semantics, or different structure than that of the second domain.

2. The method of claim 1, wherein the second trained machine learning model is configured to perform malware classification.

3. The method of claim 1, wherein the second trained machine learning model is configured to perform malware categorization.

4. The method of claim 1, wherein the second trained machine learning model is configured to perform file authorship identification.

5. The method of claim 1, wherein the first trained machine learning model is configured to infer cybersecurity-oriented file properties within the first domain.

6. The method of claim 1, wherein the first domain comprises a natural language domain.

7. The method of claim 1, wherein the first domain comprises Windows portable executable (PE) (WinPE) files associated with a Windows operating system.

8. The method of claim 7, wherein the second domain comprises files associated with a second operating system that is different from the Windows operating system.

9. The method of claim 7, wherein the second domain comprises executable files associated with a Unix operating system.

10. The method of claim 1, wherein the second dataset is smaller than the first dataset.

11. The method of claim 1, further comprising analyzing a labeled file associated with the second domain, using the second trained machine learning model, to determine a cybersecurity risk associated with the labeled file.

12. The method of claim 1, further comprising selecting the at least one trainable layer from the plurality of trainable layers of the first trained machine learning model based on a resource constraint of a compute device.

13. A method for training machine learning models for cybersecurity threat detection, the method comprising:

receiving, at a machine learning system associated with a second domain, a first trained machine learning model trained on training data associated with a first domain different from the second domain;

training the first trained machine learning model via a transfer learning process using a dataset including labeled files associated with the second domain to produce a second trained machine learning model configured to infer cybersecurity-oriented file properties for files associated with the second domain; and analyzing a labeled file associated with the second domain, at the machine learning system and using the second trained machine learning model, to determine a cybersecurity risk associated with the labeled file.

14. The method of claim 13, wherein the second trained machine learning model is configured to perform malware classification.

15. The method of claim 13, wherein the first domain comprises a natural language domain.

16. The method of claim 13, wherein the first domain comprises Windows portable executable (PE) (WinPE) files associated with a Windows operating system.

17. The method of claim 16, wherein the second domain comprises files associated with a second operating system that is different from the Windows operating system.

18. The method of claim 16, wherein the second domain comprises executable files associated with a Unix operating system.

19. The method of claim 16, wherein the second domain comprises executable files associated with a MacOS operating system.

20. One or more non-transitory computer-readable media that collectively store instructions for performing operations, the operations comprising:

receiving, at a machine learning system associated with a second domain, a first trained machine learning model trained on training data associated with a first domain different from the second domain;

training the first trained machine learning model via a transfer learning process using a dataset including labeled files associated with the second domain to produce a second trained machine learning model configured to infer cybersecurity-oriented file properties for files associated with the second domain; and analyzing a labeled file associated with the second domain, at the machine learning system and using the second trained machine learning model, to determine a cybersecurity risk associated with the labeled file.

* * * * *